UNITED STATES PATENT OFFICE.

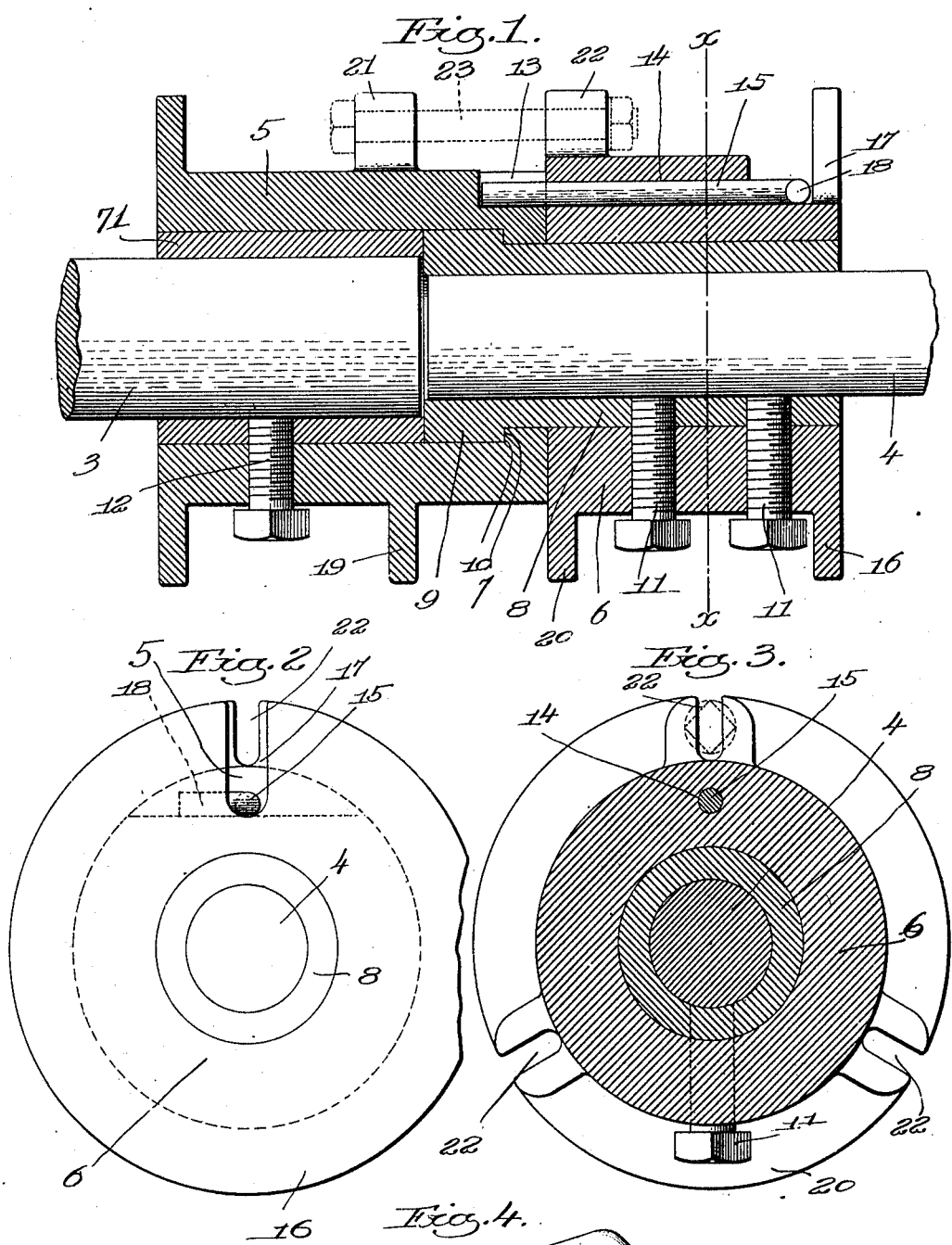

WALTER F. ROPER, OF HOPEDALE, MASSACHUSETTS, ASSIGNOR TO C. F. ROPER & CO., OF HOPEDALE, MASSACHUSETTS, A FIRM.

COUPLING.

980,341.  Specification of Letters Patent.  Patented Jan. 3, 1911.

Application filed August 4, 1909. Serial No. 511,118.

*To all whom it may concern:*

Be it known that I, WALTER F. ROPER, a citizen of the United States, residing at Hopedale, county of Worcester, and State of Massachusetts, have invented an Improvement in Couplings, of which the following description, in connection with the accompanying drawing, is a specification, like characters on the drawing representing like parts.

This invention relates to couplings and particularly to that type of coupling wherein the two members are connected together by a shearable or breakable connection so that when the machine or device to be driven meets with some undue obstruction or opposition the breakable connection will be severed, thus preventing injury to the driven part.

One of the objects of my present invention is to provide a coupling of this nature so constructed that if the shearable or breakable connection becomes broken the two parts thereof can be readily removed for the insertion of a new connection.

Another object is to provide a coupling of this nature wherein if desired the two members can be rigidly and solidly coupled together by a non-breakable connection.

Still another object is to provide a novel coupling of this nature which is adapted to withstand longitudinal thrust in both directions.

Other objects of the invention are to improve generally and to simplify couplings of this nature, all as will be more fully hereinafter described.

In the drawings wherein I have shown one embodiment of my invention, Figure 1 is a longitudinal section through a coupling made in accordance with the invention; Fig. 2 is an end view of Fig. 1 looking to the left; Fig. 3 is a section on the line *x—x*, Fig. 1, looking toward the right; Fig. 4 is a detail of the shearable or breakable connection.

My improved coupling is adapted for use in various ways, but has particular advantages when used for coupling two shafts together, such, for instance, as the engine shaft and the propeller shaft of a motor boat or other vessel. In the drawings I have shown two such shafts at 3 and 4, respectively, and 3 may indicate the engine shaft and 4 the propeller shaft. It will be understood, however, that these shafts may be any two shafts and are not necessarily engine and propeller shafts respectively.

The coupling herein shown comprises the member 5 which is secured to the shaft 3, and the member 6 which is secured to the shaft 4. The coupling member 5 is provided with the interior bore which is of reduced diameter at the end adjacent the coupling member 6 whereby an interior shoulder 7 is formed between the two portions of different diameter, and the member 6 has associated therewith a sleeve 8 which extends beyond said member 6 to constitute a hub that is received in the end of the coupling member 5. The extended end of the sleeve 8 is provided with the enlarged portion 9 having the exterior shoulder 10 which engages the interior shoulder 7 of the member 5. The sleeve 8 is held in the coupling member 6 in any suitable way, as by means of screws 11, and these screws 11 may also be used to secure the coupling member 6 to the shaft 4. The coupling member 5 is secured to the shaft 3 in any suitable way, as by means of the set screw 12. I will preferably use a sleeve 71 within the coupling member 5 and surrounding the shaft 3 and this sleeve may be held in place by the set screw 12 which secures said coupling member 5 on the shaft. The end of the sleeve 71 is shown as engaging the head 9. The end of the sleeve 71 and the shoulder 7 constitute two opposing shoulders between which the head or enlarged portion 9 of the sleeve 8 is received and these two opposed shoulders and the head 9 serve to take the longitudinal thrust on the two shafts in both directions.

The coupling member 5 is provided with an open recess or groove 13, and the coupling member 6 is provided with a longitudinally-extending bore or passage 14 which is adapted to receive a pin or other connection 15 that constitutes the breakable or shearable connection between the couplings. The bore 14 is in alinement with the groove 13 so that when the pin 15 occupies the bore, the end of the pin will be received in the open groove 13, and said pin will thus connect the two coupling members 5 and 6 together so that they will rotate in unison.

Assuming that the shaft 3 is the driving shaft and the shaft 4 the driven shaft, it will be seen that the power will be transmitted from the driving to the driven shaft through the pin 15. If the driven shaft should meet with some unusual obstruction or resistance, the pin will be sheared off, thus permitting the driving shaft to run without operating the driven shaft.

I have herein shown means for locking the coupling pin 15 in position so as to prevent it from accidentally working backwardly in the bore 14 sufficiently to be withdrawn from the recess or groove 13, and I accomplish this herein by providing the coupling member 6 with a locking wall and further providing said pin with a head which is adapted to engage said wall. In the present embodiment of my invention this locking wall is secured by making the coupling member 6 with the radial flange 16 and forming in said flange an aperture 17 in alinement with the bore 14. The head on the pin 15 is shown at 18, and this head is of a shape to permit it to pass through the aperture 17 when the pin is in one position axially, and when the pin is placed in its operative position it may be turned thereby bringing the head out of alinement with the aperture 17 and against the flange 16. In the embodiment herein shown the aperture 17 is in the nature of a radial slot and the head 18 is simply formed by bending the end of the pin, as seen in Fig. 4. The shape of the aperture 17 and head 18 may be changed, however, without departing from the invention, it only being necessary that they be of such a shape relative to each other that when the pin is in operative position it may be turned to cause the head to engage the flange 16 either side of the aperture 17. The advantage of the groove 13 is that if the pin 15 is sheared off the portion which occupies the groove 13 will be thrown out of the groove by the rotation of the coupling member 5, and the operation of inserting a new coupling pin involves merely the withdrawal of the portion of the pin remaining in the bore 14, which can be readily done because one end of said portion of the pin is exposed, and the insertion of a new coupling pin. I have also provided means whereby the two members 5 and 6 can be rigidly and solidly coupled together by a non-breakable connection if it is desired not to use a breakable coupling. In the present embodiment I accomplish this object by providing the coupling members 5 and 6 with the flanges 19, and 20 which are provided with the slots 21 and 22, respectively. If the two members are to be rigidly coupled together bolts 23 shown in dotted lines Figs. 1 and 3 may be placed in the slots 21, 22, thus making a rigid connection between the two coupling members.

I will preferably make the head 9 with a loose fit within the coupling member 5, so that the two coupling members may move laterally slightly relative to each other. This construction is of special advantage where the coupling is used for coupling an engine shaft to a propeller shaft because it allows for any slight deviation from the true alinement and prevents binding of the parts.

I wish it understood that my invention can be used for coupling any two members together and also that I have illustrated herein one embodiment only of the invention and have not attempted to show any of the various different styles of couplings in which the invention may be embodied.

Having fully described my invention, what I claim as new and desire to secure by Letters Patent is:—

1. In a coupling, the combination with two members to be coupled together, one member having two opposed abutment walls forming between them an open-sided recess, and the other member having an aperture or bore which is alined with the recess, of a shearable coupling pin extending through said aperture and entering said open recess whereby whenever said coupling pin becomes sheared off the portion thereof occupying the recess will be free to be removed laterally therefrom.

2. In a coupling, the combination with two axially-alined members to be coupled together, one having an open-sided groove and the other having an aperture in line with said groove and a radial flange spaced from the end of the aperture and provided with a slot in line with said aperture, of a shearable coupling pin adapted to be passed through the slot in the flange and into said aperture and with one end occupying the open groove.

3. In a coupling, the combination with axially-alined members to be coupled together, one member having an open-sided recess and the other member having a flange provided with an opening and also an aperture in line both with said opening in said flange and with said recess, of a shearable coupling pin adapted to be passed through the opening in the flange and into said aperture with one end occupying the open recess and provided with a head, said head and opening having such relative shapes as to permit the head to pass through the opening when the pin occupies one axial position but to prevent said head from passing through said opening when the pin occupies another axial position.

4. In a coupling, the combination with two axially-alined members to be coupled together, one member having an open-sided groove and the other member having a slotted radial flange and an aperture in line with the slot in said flange and also in alinement with said groove, of a shearable coupling pin adapted to be passed through the slot in the flange and into the aperture with one end occupying the open groove, said pin having a head of a shape corresponding to that of the slot whereby said head may be passed through the slot and when the pin is in its operative position it may be turned to bring the head against the flange thereby locking the pin in place.

5. In a coupling, the combination with two axially-alined members to be coupled together, one having an open-sided groove and the other having a slotted radial flange and an aperture in line with the slot in said flange and also in alinement with said groove, of a shearable coupling pin occupying said aperture and having its end received in said groove, one end of the pin being bent to form a head which engages the flange and prevents withdrawal of the pin.

6. In a coupling, the combination with two members to be coupled together, one member having an axial bore presenting two portions of different diameter thereby forming an internal shoulder between said portions, the portion of smaller diameter being adjacent the other coupling member, and said other member having associated therewith a hub which extends into the first-named member and is provided with an exterior shoulder to engage said interior shoulder, and a shearable pin connecting said coupling members for rotary movement.

7. In a coupling, the combination with two members to be coupled together, one member having an axial bore presenting two portions of different diameters thereby forming an internal shoulder between said portions, the portion of smaller diameter being adjacent the other coupling member, of a sleeve situated within said other coupling member and having a portion extended into the first-named coupling member, the extended portion of the sleeve being enlarged in diameter at its end thereby forming an exterior shoulder, said portion of enlarged diameter occupying the enlarged portion of the bore and the exterior shoulder engaging the interior shoulder of the first-named coupling member, and a shearable pin uniting said members for rotary movement.

8. In a coupling, the combination with two coupling members, of a removable breakable connection uniting said members, said members having provision for solidly coupling them together in case the breakable connection is broken or a non-breakable connection is desired.

9. In a coupling, the combination with two coupling members, of a breakable connection connecting said members for rotary movement, said coupling members each having a radial slotted flange whereby said members can be rigidly and solidly clamped together by a bolt located in the slots of the flange.

10. In a coupling, the combination with a coupling member having an interior shoulder, of another coupling member having associated therewith a hub or projection which extends into the first-named coupling member and fits loosely therein and which also has an exterior shoulder adapted to engage the interior shoulder on the first-named coupling member, and a shearable connection connecting said members for rotary movement.

11. In a coupling, the combination with a coupling member having two opposed interior shoulders, of another coupling member having associated therewith a hub or projection which extends into the first-named coupling member and is received between said shoulders, and a shearable connection connecting said members for rotary movement, said hub and two opposed shoulders operating to resist thrust in both directions.

In testimony whereof, I have signed my name to this specification, in the presence of two subscribing witnesses.

WALTER F. ROPER.

Witnesses:
Wm. O. Perkins,
C. H. Draper.